United States Patent [19]

Silverman

[11] 3,983,957
[45] Oct. 5, 1976

[54] METHOD AND APPARATUS FOR CREATING SEISMIC WAVES IN THE EARTH

[76] Inventor: Daniel Silverman, 5969 S. Birmingham St., Tulsa, Okla. 74105

[22] Filed: Jan. 6, 1975

[21] Appl. No.: 538,924

Related U.S. Application Data

[63] Continuation-in-part of Ser. No. 296,670, Oct. 11, 1972, Pat. No. 3,860,087.

[52] U.S. Cl. ............................. 181/121; 181/114; 340/17 R
[51] Int. Cl.² ........................................ G01V 1/14
[58] Field of Search ............. 181/121, 114; 340/17; 73/71.7

[56] References Cited
UNITED STATES PATENTS

| | | | |
|---|---|---|---|
| 2,283,588 | 5/1942 | Strom | 73/71.7 |
| 2,312,850 | 3/1943 | Scharoun | 73/71.7 |
| 3,363,720 | 1/1968 | Mifsud et al. | 181/114 |
| 3,658,148 | 4/1970 | Clynch | 181/114 |
| 3,690,402 | 9/1972 | Stafford | 181/114 |
| 3,866,709 | 2/1975 | Mifsud | 181/121 |
| 3,905,446 | 9/1975 | Ross | 181/114 |

*Primary Examiner*—H.A. Birmiel

[57] ABSTRACT

A mass positioned above the earth and having downward extensions, which may include wheels, resting on the earth. One or more closed chambers having two parts vertically reciprocable with respect to each other, one part pressing on the earth, the other part fastened to the underside of the mass. Means to inject pressurized fluid into the chamber to expand the chamber and to lift the mass above the earth, and means to modulate the fluid pressure in the chamber to generate seismic waves in the earth, and means alternately to apply a subatmospheric pressure to the chamber, to collapse the chamber and lift said one part above the earth.

33 Claims, 10 Drawing Figures

METHOD AND APPARATUS FOR CREATING SEISMIC WAVES IN THE EARTH

CROSS REFERENCE TO RELATED APPLICATIONS AND PATENTS

This application is a continuation-in-part of my copending application, Ser. No. 296,670 filed Oct. 11, 1972 entitled *Vibrator Systems for Generating Elastic Waves in the Earth*, now U.S. Pat. No. 3,860,087.

It is also related to U.S. Pat. No. 3,789,591 issued Feb. 5, 1974 entitled *Vibrator System for Generating Seismic Waves in the Earth*. Ser. No. 296,670 and U.S. Pat. No. 3,789,951 are both entered into this application by reference.

BACKGROUND OF THE INVENTION

This invention lies in the field of seismic prospecting and is more specifically in the field of apparatus for generating elastic (seismic) waves in the earth. Still more specifically it concerns such apparatus in which the vibrator is mounted on a vehicle, and the mass of the vehicle serves as the reaction mass for the vibrator.

In the prior art vibrators have always carried their own reaction mass, separate from the mass of the carrying vehicle, such as a truck. In applicant's U.S. Pat. No. 3,789,951 and copending application Ser. No. 296,670 the concept of using the truck mass for the reaction mass has been shown. However, even these systems require hydraulic means, separate from the vibrator itself, for raising the truck and supporting it on top of the base plate, while the vibrator is operating, and then lowering the truck, and using the same hydraulic means to lift the base plate and the vibrator, while the truck is traveling.

The use of a heavy base plate is a disadvantage, which adds cost to the devices, and reduces (by its mass) the output of the vibrator into the earth. Further the hydraulic system is an added cost and weight, which in this invention is eliminated.

SUMMARY OF THE INVENTION

It is a primary object of this invention to provide an earth vibrator which uses the mass of the vehicle as at least part of its reaction mass.

It is a further object of this invention to provide a vibrator which presses directly onto the earth without the necessity of using a base plate.

It is a still further object of this invention to obviate the need for a hydraulic lift system to alternately lift the truck, and then the base plate, by applying a superatmospheric pressure to the chambers to lift the vehicle and to modulate this pressure to generate the seismic wave, and alternately to apply a subatmospheric pressure to the chambers to lower the vehicle and lift the vibrator out of contact with the earth.

These and other objects are realized and the limitations of the prior art are overcome in this invention by using one, or a plurality of vibrating chambers in parallel. One part of each is attached to the underside of the mass, or frame, of the vehicle, and the second part of each presses against the earth, either directly, or through the medium of a baseplate.

The range of expansion of the vibrator from its relaxed to its pressurized condition is such that, under pressure the vibrator chamber, or chambers, will lift at least part of the truck free of the earth, which part will become the reaction mass of the vibrator.

The vibrator chambers can be simple pistons and cylinders, or flexible walled chambers, or bags. There may be a single chamber, or preferably a plurality of chambers arranged in a two-dimensional horizontal array.

The chambers can be connected successively to a fluid supply at a high pressure $P_H$, and a fluid reservoir at a lower pressure $P_L$, where the pressure $P_L$ is still high enough to support the truck above the earth.

When the vibrating cycle is complete, the high pressure fluid is removed, lowering the vehicle to the ground, and a subatmospheric pressure is applied to the chambers, to lift the lower part to its uppermost position, free of the earth, so that the vehicle can move. The working fluid serving to operate the vibrator as well as to obviate the need for the conventional hydraulic lifting means.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENTS

Figure 1:
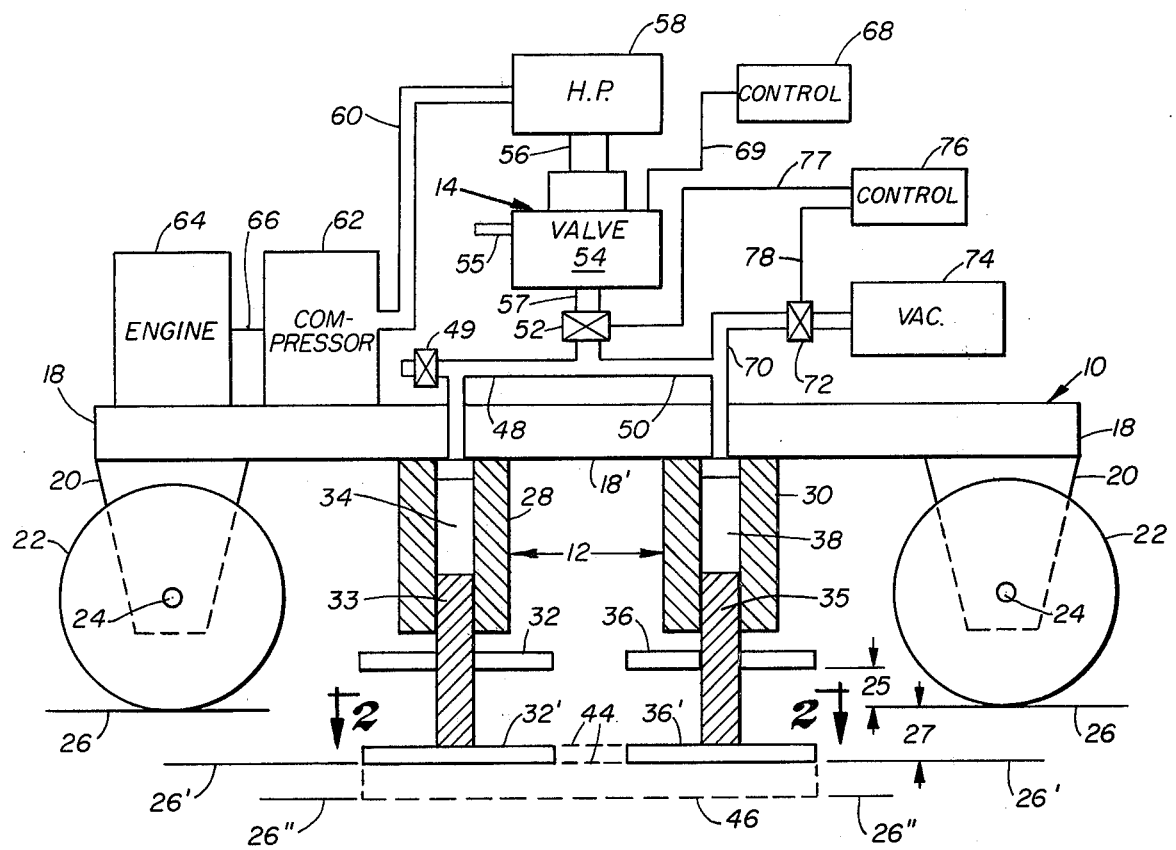
FIG. 1 is a schematic view, in elevation of one embodiment of the invention, using high pressure fluid and cylinders with pistons.

Referring now to the drawings, and in particular to FIG. 1, there is shown one embodiment of this invention. It comprises a mass, indicated generally by the numeral 10, which includes a frame 18 having a plurality of downward depending extensions 20, which may rest directly on the earth, or which may support axels 24 and wheels 22. Thus the mass 10 may constitute a vehicle, which may or not be self propelled, as desired. The important thing is that there be a portion of the frame 18, such as 18', which is supported by the extensions 20 at a selected distance above the earth.

Figure 3:
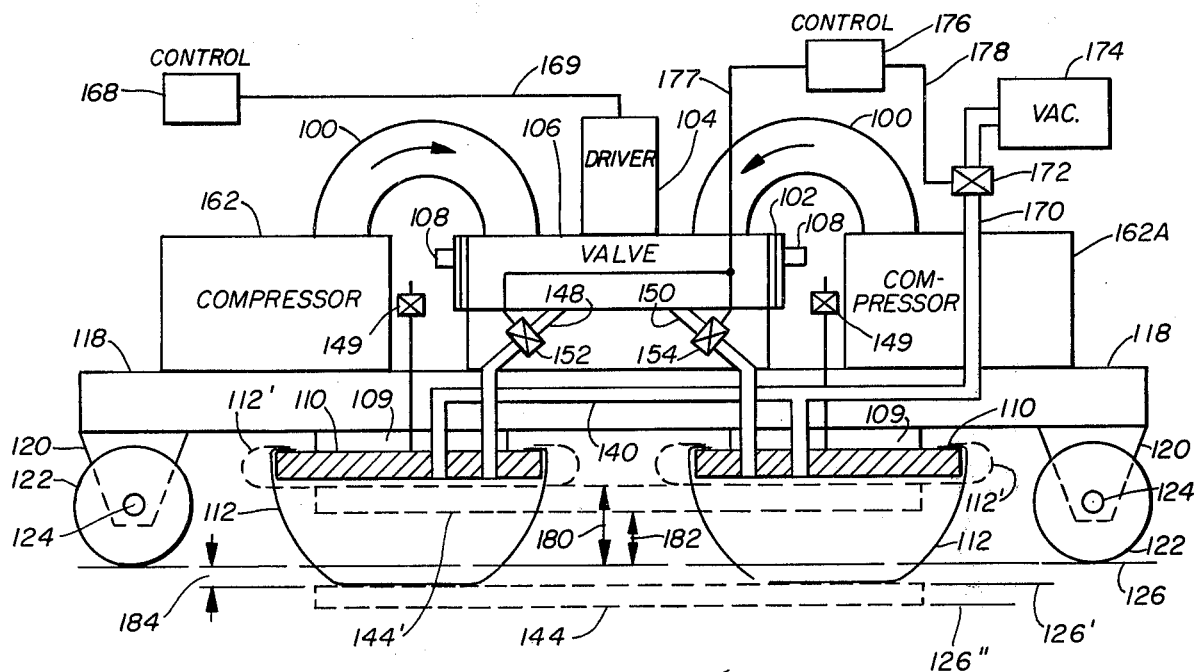
FIG. 3 is a view similar to that of FIG. 1, except of an embodiment utilizing low pressure gas and flexible walled chambers.

There are one, or a plurality of vibrating chamber means indicated generally by the numeral 12. These may be illustrated, rigid-walled cylinders and pistons, or as shown in FIG. 3, they may be flexible-walled chambers, or bags, etc. The pistons 33, 35 may carry foot plates 32, 36 to have a sizeable area with which to press against the earth.

Or, the separate foot plates 32, 36 attached to the pistons 33, 35 may be combined into one large area plate 44, in dashed outline, or base plate, as conventionally used in seismic operations.

Either the cylinders (as shown) can be attached to the underside of the mass 10, and the pistons may press directly onto the earth, or press on a base plate such as 46 shown in dashed outline, which, in turn, presses on the earth, or the pistons may be attached to the underside of the mass 18, while the cylinders press on the earth. In any case there is at least one expansible chamber having two parts which reciprocate in a vertical direction with respect to each other. One part is fastened to the underside of the mass, and the second part pressed on the earth, either directly or through means of a base plate attached to said second part.

When the pistons are drawn up into the cylinders, such as by connecting the cylinders to a pressure less than atmospheric pressure, the bases of the pistons will be in the positions 32 and 36. They are thus raised above the level 26 of the ground on which the wheels 22 rest. In that position the vehicle can move along the ground without interference from the plates 32, 36.

On the other hand, when a high pressure fluid is forced into the cylinders the pistons will be extended downwardly to their postions 32', 36' respectively. If the fluid is high enough pressure, so as to support the weight of the mass 10, the mass will be lifted with the wheels 22 above the level 26' of the ground, with the piston foot plates 32' 36' pressing on the ground surface 26'. Of course, when a base plate is being used such as 44, the base plate will press on the ground surface 26'. If a separate baseplate is used such as 46 then the ground surface will be at 26''.

Thus, by alternately impressing on the chambers 12 a superatmospheric pressure of sufficient magnitude, the mass will be lifted above the earth and will rest on the pistons or base plate, while if a subatmospheric pressure fluid is used, the pistons or base plate will be lifted off the ground, the wheels will rest on the ground and the vehicle can move on its wheels.

Shown in FIG. 1, as mounted on the frame 18 of the vehicle, or mass 10, are an engine 64, drive means 66 and fluid compressor 62. The engine can be used, of course, to alternately drive the vehicle, and drive the compressor, as is common in seismic operations. The compressor can be a high pressure liquid compressor, such as used in present day seismic vibrators, or it can be a gas compressor of intermediate pressure, or a gas blower of low pressure, as will be further discussed below. For convenience FIG. 1 will be described in terms of a high pressure liquid, hydraulic, system, while FIG. 3 will be described in terms of a low pressure gas, pneumatic, system.

The compressor 62 is connected by pipe 60 to a high pressure liquid accumulator 58. This connects by pipe 56 to an electro-hydraulic valve system 54, which may be of any convenient design, such as are used on conventional seismic vibrators. There are shown 2 conduits 48, 50 connected respectively between cylinders 28 and 30 and the valve means 54 through a valve 52 which will be explained later. There is a control box 68 and lead 69 connected to the valve 54 by means of which the valve is driven in terms of an electrical signal. The electrical signal can be of any desired form, frequency and duration, but is preferably in the form of a long, alternating time function of selected frequency range and time duration. Such signals are commonly called "sweep" signals, or "chirps" because of their changing frequency. This invention is not concerned with the type of signal used.

It will be clear, therefor, that if there is a pipe 55 from the valve 54 that connects to a low pressure liquid reservoir, from which the compressor 62 takes its input, that when the high pressure is applied to the valve, and through it to the cylinders, the pulsating pressure applied to the cylinders will lift the mass 10 above the ground, and with the mass as a reaction mass, will apply a pulsating pressure to the earth through the pistons and/or through the base plate.

When the application of the sweep is completed, the high pressure is removed from the cylinders. This will cause the pistons to withdraw and the mass to be lowered to the ground. The cylinders are then connected through pipe 70, and valve 72 to a source of subatmospheric pressure, or vacuum 74. If the valve means 54 seals off the pipe 57, then the pipes 48, 50 and the cylinders are under vacuum, and the pistons will be withdrawn to their upper position, where they are above ground level.

If the valve means 54 in its off position does not shut off completely the pipe 57, then an additional valve 52 can be inserted in the pipe 57, so that with 52 closed and 72 open the vacuum can be applied to the cylinders, after which the valve 72 is closed locking the low pressure in the cylinders, with the piston withdrawn.

With a simple valve or "leak" 49 connected to the pipe manifold 48, 50, a much simpler valve means can be used at 54, such as a simple valve to apply spaced pulses of high pressure fluid to the cylinders, while this pressure leaks off continuously, through the leak 49 to a low pressure reservoir (not shown).

Figure 1A:
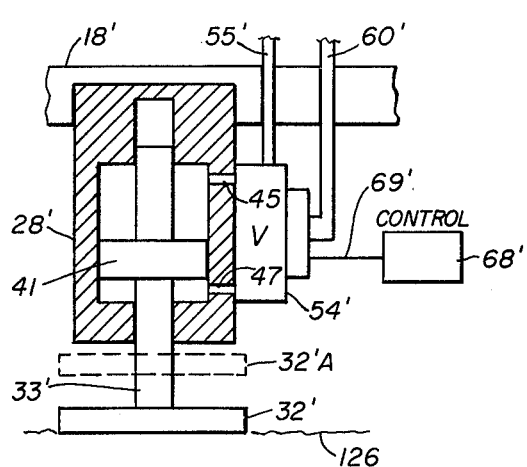
FIG. 1A shows a variation of part of FIG. 1.

Referring now to FIG. 1A there is shown a portion of the system of FIG. 1 with a single, double-acting cylinder 28' and piston 41, and piston rod 33' with or without footplate 32' or baseplate, pushing on the ground 126. Here the valve 54' has two outlets 45, 47 going to either side of the piston 41. In operation, the control is such that the time "on" of pressure to lead 45 is greater than the time that pressure is on lead 47. Thus there will be a biasing force downward which will lift the mass 18', and apply the pulsating pressure to the piston 41 and to the earth. At the end of the sweep, high pressure is left on lead 47, which lifts the piston and plate 32' above the ground. In this design of cylinder the freedom of motion of the piston 41 in the cylinder 28' will have to be greater than in conventional vibrators, where the mass 10 is supported by compliances resting on the earth, and the cylinder and baseplate must be lowered and raised for operation and travel respectively.

Figure 2:
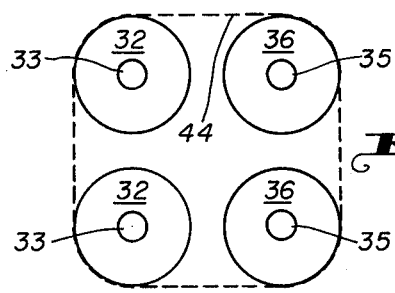
FIG. 2 is a cross section taken along the plane 2—2 of FIG. 1.

While FIG. 1 shows two cylinders 28, 30, there can be only one, or a multiplicity. FIG. 2 shows a crossection across plane 2—2 of FIG. 1. This indicates 4 pistons 33, 33, 35, 35 and footplates 32, 32, 36, 36 arranged in a two dimensional array. There can, of course, be 3 or more in such an array, which because of its two dimensions, provides a more stable support when the mass is lifted above the ground.

Referring now to FIG. 3, there is shown another embodiment of a vibrator system, arranged generally along the lines of the system of FIG. 1, but utilizing a low pressure gas, and having flexible wall chambers in place of rigid cylinders and pistons.

There is a mass, or frame, or vehicle 118, having downward extensions 120, with wheels 122 and bearings 124. On the frame 118 are shown two compressors or blowers, 162, 162A, driven by engines not shown. These supply large volumes of air at low pressure through conduits 100 to a central valve system 106. This is driven by a driver 104, which can be electro-hydraulic, electro-mechanical, or motor driven, etc. or in any way desired.

There are mounted to the underside of the frame 118 two (four) vibratory chambers 112. Again, as will be described in connection with FIGS. 4, 5, there can be one or more such chambers. As contrasted with FIG. 1, these are flexible walled chambers, comprising bags sealed around the edges of circular plates 110, by means well known in the art. The plates 110 are supported to the underside of the frame 118, through means of plates 109.

When the bags 112 are inflated they take the form of the solid lines 112, pressing directly onto the earth 126', or onto a baseplate 144 (shown in dashed outline) to which tey are fastened. When the superatmospheric pressure inside the chambers is removed and a subatmospheric pressure applied, the bags will collapse with the part normally in contact with the earth lifted up to the position 112', until it is in contact with the plate 110. Thus the bottom of the bags will be well above the ground level 126, on which the wheels 122 would be resting, by dimension 180. If a baseplate 144' is used it will be above ground level 126 by dimension 182.

The valve means 106 is supplied with pressurized air through conduits 100 from one or more compressors or blowers, and may include a high pressure gas reservoir (not shown) if desired. The valve outlets comprise pipes 148, 150, of which in the design shown, there are 4 each, to the chambers 112, of which there are 4. Of course, as will be explained in connection with FIGS. 4, 5 there can be 1 or more chambers fed with pressurized air by pipe or pipes 148, 150.

The valve may have outlets 108 to the atmosphere, so that the chambers 112 can be alternately connected to the high pressure air, or to the atmosphere, causing them to press on the earth with an alternative pressure.

By having the time during which the chambers are connected to the high pressure longer than the time that they are connected to low pressure (the atmosphere) there will be a resulting positive pressure in the chambers, causing them to be inflated to the condition shown, where the wheels 122 are off the ground by dimension 184.

When the sweep is completed, the valves 152, 154 in the pipes 148, 150 are closed, and valve 172 in pipe 170 connected to all the chambers, is opened to a subatmospheric pressure chamber 174. This will cause the bags to collapse and to be lifted well out of contact with the ground, in condition for travelling. Control 176 can be used to close valves 152, 154 through lead 177, open valve 172 through lead 178 until the bags are lifted and then to close valve 172. To go into operation the valves 152, 154 are opened and with operation of the valve 106, the chambers 112 are inflated, the mass is lifted, and the cycle of sweep is started. To lift the mass, the valve 106 can be opened to the high pressure position until the mass is in lifted position, and then the sweep started.

The design of the valve 106 is not critical and can be, among other forms, a rotating cylinder inside of a stationary cylinder, with appropriate openings in each, open and close, as the cylinder rotates. Or it can be a rotating disc with a matching stationary disc, both with appropriate openings in each. It can conveniently be a cylinder moving axially, driven by an electro-hydraulic servo, such as described in U.S. Pat. No. 3,792,751 issued Feb. 19, 1974 to D. W. Fair. If a rotating system, it is possible to control the speed of the motor by means of a servo control well known in the art.

Another type of control is to use on electronic inverter converting D.C. to an A.C. of selected variable frequency. This can be used to drive an electrodynamic magnet system to vibrate the valve axially and so on.

Figure 5:
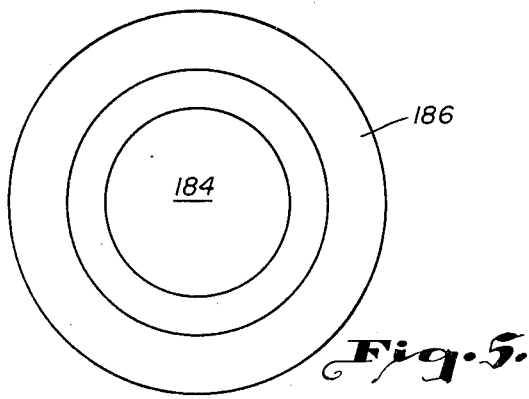
Figure 4:
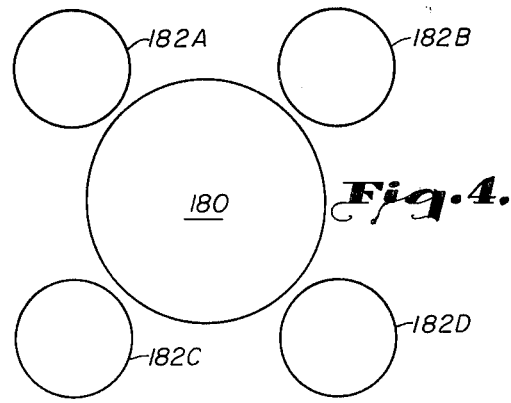

Referring now to FIGS. 4 and 5, there are shown 2 dimensional arrangements of chambers. One can be a single large diameter chamber like 180 of FIG. 4.

Another can be a group of say three, four or more smaller chambers, such as 182A, 182B, 182C, 182D, etc. A plurality of small chambers, fed through separate pipes have a better chance of maintaining equal internal pressures, and thus to maintain the lifted mass on a level basis, than when a single large chamber is used. In this latter case, the mass would have to be carefully balanced to remain level.

Figure 6:
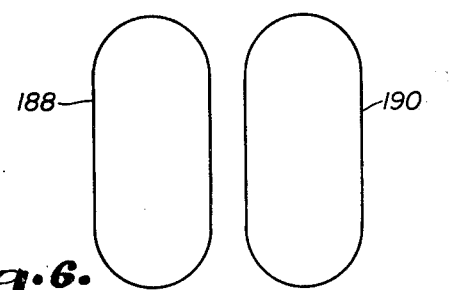
FIGS. 4, 5 & 6 illustrate other possible arrangements of chambers.

By modifying the valve means 106, two similar valves, operating in parallel, could be used, each separately controlling the flow of pressurized air from a separate compressor 162, 162A to a separate chamber, or pair of chambers. The design of chambers shown in FIG. 6 would be ideal for this, two compressors, two conduits, two valves, two chamber systems, maintaining good balance of the lifted mass.

If desired it is possible to apply a constant air pressure to one of the chambers such as 180, or 184 and supply a pulsating pressure to the others, such as 182A, 182B, 182C and 182D or 186, or vice versa. The constant pressure serves to lift the mass to its suspended position. Then the pulsating input to the other chamber or chambers applies to oscillating pressure which generates the seismic wave.

Figure 7:
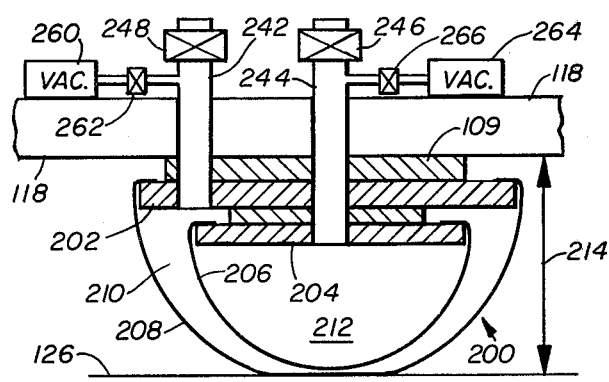

Referring now to FIG. 7 there is shown another embodiment of the pressurized chamber 200. This comprises a first inner chamber having a mounting plate 204 and bag 206, and an outer chamber having a mounting plate 202 and bag 208. The constant fluid pressure can be applied to the inner or outer bags. However, it is preferred to apply the constant pressure to the inner bag, and the pulsating pressure to the outer bag.

Preferably the constant pressure fluid applied to the inner bag can be a liquid which compared to the gas may be considered incompressible. This provides a desireably small volume 210 in the space between the inner and outer bags, and thus provides more rapid response of the pressure applied to the earth, to the sudden application of pressure fluid to the space 210.

It is desired that the dimension vary over a wide range between expanded and collapsed positions, and this use of an inner "incompressible" bag, can provide this wide range of dimension without, in effect, providing a compliance in series with the pulsating flow.

Of course, the fluids in both volumes 210, 212 can be liquid, with the liquid in 212 being at higher pressure than the liquid in the space 210.

As was described in connection with FIG. 3, the bags 206, 208, which are supplied with fluid pressure through pipes 244, 242 respectively, can be collapsed by closing valves 246, 248 and connecting pipes 244, 242 to vacuum 264, 260 through valves 266, 262 respectively. This will lift the bags 206, 208 into contact with the plates 204, 202 so as to provide road clearance for traveling.

Figure 8:
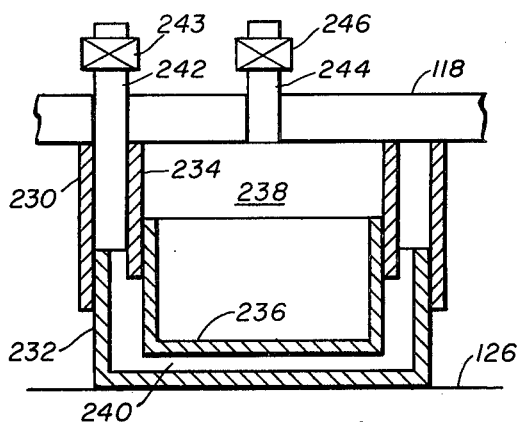

Referring now to FIG. 8, there is shown a similar type of double chamber having wide extensibility between expanded and collapsed positions, while having small volume in the outer space 240 for pulsating fluid pressure and constant pressure in the space 238. It is preferable to have liquid in the inner space and liquid or gas in the outer space. In this rigid walled chamber design, liquid in both volumes would be desirable.

The hollow piston 232 slidably sealed in the cylinder 230 is driven by pulsating pressure through pipe 242. The inner piston 236 slides in the cylinder 234 and is filled with liquid under high pressure through the pipe 244. Once filled the valve 246 can be closed until the end of the sweep, at which time both chambers 238, 240 are brought to subatmospheric pressure to lift both pistons so as to clear the ground. As in the other figures, one or more chambers like that of FIGS. 7 and 8 can be used in parallel to give broad support to the suspended mass. Conversely, a single large chamber can be used.

Most of the figures show the chambers as single acting pistons and cylinders, or rams, and corresponding single bags, with a valve system that alternately connects the chambers to a high pressure source, and then to a low pressure receiver, conversely a valve can be used that successively connects the chamber for selected intervals to a high pressure source, and utilizes a constant leak flow of fluid from the chamber. It will be clear that the various sytems of double acting pistons and cylinders, or pairs of flexible walled chambers disclosed in U.S. Pat. No. 3,789,951 and application Ser. No. 296,670, both of which are entered in this application by reference, can be used.

While I have shown one type of flexible walled chamber, comprising a closed cylindrical or annular bag, many other types can be used, such as for example, bellows type metal systems. Also flexible cylindrical tubes can be used clamped and sealed to circular plates at each end. Other systems can be used similar to the air bags used in trucks, etc. for springs.

Figure 9:
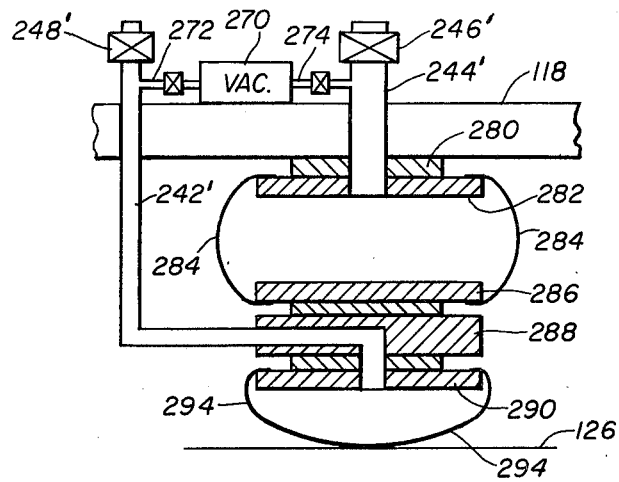
FIGS. 7, 8 & 9 illustrate series connected chambers using constant pressure liquid in one chamber, with pulsating gas pressure in the other.

Referring now to FIG. 9, there is shown a variation of FIGS. 7 and 8, in which the two bags are physically separate and in series. A first bag 284, clamped to plates 282, 286, is attached to the underside of frame 118 by plate 280. A second bag 294 attached to plate 290 is supported by the first bag 284 through the intermediate plate 288. A constant liquid pressure can be applied to the first bag 284 through pipe 244' and valve 296' to expand it and lift the frame 118. Then a pulsating pressure can be applied to the second bag 294, through pipe 242' and valve 248' to apply a pulsating force against the earth 126. By closing valves 246' and 248' and opening valves in lines 272, 274 to a source 270 of subatmospheric pressure, both bags are compressed and lifted above the earth 126.

FIGS. 7 and 9 are operatively equivalent, although the system of FIG. 7 is simpler and occupies less overall volume, and is the preferred apparatus.

While the invention has been described with a certain degree of particularlity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A system for creating a train of seismic waves in the earth, comprising:
   a. a mass having extension means resting on the earth and supporting said mass in a position above the earth;
   b. at least one expandable chamber comprising at least two parts reciprocable vertically with respect to each other;
   c. a first part supported by the earth;
   d. a second part attached to said mass;
   e. means to inject pressurized fluid into said chamber at a selected superatmospheric pressure;
      whereby said chamber will expand vertically, said first part will press on the earth, and said second part will lift said mass above the earth; and
   f. means to modulate the pressure of said pressurized fluid to form a train of pulses of pressurized fluid in to said chamber;
      whereby said mass will act as a reaction mass and said first part will impart a train of pressure pulses on the earth and generate a train of seismic waves in the earth.

2. The system as in claim 1 including means alternately to apply a subatmospheric fluid pressure to said at least one chamber, whereby said chamber will be deflated, said mass will be lowered until said extension means rest on the earth, and said first part will be lifted above the earth.

3. The system as in claim 2 in which said extension means of said mass comprise a plurality of wheels, such that when said chamber is inflated, said wheels will be above the earth, and when said chamber is deflated said wheels will rest on the earth, and said first part of said chamber will be lifted above the earth.

4. The system as in claim 1 in which said at least one chamber comprises a cylinder with a piston and piston rod reciprocably sealed therein, either said cylinder or said piston rod comprising the first part, and said piston rod or said cylinder comprising the second part.

5. The system as in claim 1 in which said at least one chamber comprises a closed flexible bag.

6. The system as in claim 5 in which the closed end of said bag is said first part and rests on the earth, and the open end is sealed to a plate means which comprises said second part.

7. The system as in claim 1 including a plurality of expandable chambers, a first part of each adapted to press on the earth, the second part of each attached to said mass.

8. The system as in claim 7 in which said train of pulses or pressurized fluid flows into each of said chambers.

9. The system as in claim 7 in which a constant pressure of pressurized fluid of selected value is applied to at least one of said chambers, and a train of pulses of pressurized fluid flows into at least another one of said chambers.

10. The system as in claim 7 in which said plurality of chambers are placed in a two dimensional horizontal array.

11. The system as in claim 7 including separate pressurized fluid storage means and separate modulation means connected to each of a plurality of said chambers.

12. The system as in claim 1 in which said means to modulate the pressure of said pressurized fluid comprises a source of pressurized fluid of high pressure, a receiver of pressurized fluid of low pressure and means to successively connect said chamber to said source of high pressure and to said receiver of low pressure.

13. The system as in claim 1 in which said means to modulate said pressure of said pressurized fluid comprises a source of pressurized fluid of high pressure, a controllable fluid leak, connected to said chamber and means to repetitively connect and remove said chamber to and from said source of a high pressure.

14. The system as in claim 12 in which said fluid is a gas and said receiver of pressurized fluid of low pressure is the atmosphere.

15. The system as in claim 1 in which said pressurized fluid comprises a gas.

16. The system as in claim 1 including a base plate attached to said first part, and positioned between said first part and the earth, whereby when said first part is lifted said base plate will be lifted above the earth.

17. The system as in claim 1 in which said at least one expandable closed chamber is a double chamber comprises comprising two closed expandable chambers, one inside the other, the inner chamber of smaller volume than the outer chamber, a constant fluid pressure applied to one chamber and a pulsating fluid pressure applied to the other.

18. The system as in claim 17 in which one chamber is filled with fluid at a high constant pressure $P_H$ while the other chamber is filled with a fluid at a pulsating pressure of peak value $P_L$, where $P_L < P_H$.

19. The system as in claim 18 in which the chamber of pressure $P_H$ is filled with liquid and the other chamber is filled with gas.

20. The system as in claim 19 in which the inner chamber is filled with liquid and the outer chamber is filled with gas.

21. A system for creating a train of seismic waves in the earth, comprising:
  a. a mass having extension means resting on the earth and supporting said mass in a position above the earth;
  b. at least two expandable chambers, each comprising at least two parts reciprocable vertically with respect to each other;
  c. a first part of a first chamber supported by the earth;
  d. a second part of said first chamber attached to a first part of said second chamber;
  e. a second part of said chamber attached to said mass;
  f. means to inject pressurized fluid into both of said chambers at selected superatmospheric pressures; whereby said chambers will expand vertically, said first part of said first chamber will press on the earth, and said second part of said second chamber will lift said mass above the earth; and
  g. means to modulate the pressure of at least one of said pressurized fluids to form a train of pulses of pressurized fluid into said chamber; whereby said mass will act as a reaction mass and said first part will impart a train of pressure pulses on the earth and generate a train of seismic waves in the earth.

22. The system as in claim 21 including means alternately to apply a subatmospheric fluid pressure to at least one of said two chambers, whereby said chamber will be deflated, said mass will be lowered until said extension means rests on the earth and said first part of said first chamber is lifted above the earth.

23. The system as in claim 22 in which said subatmospheric pressure is applied to both of said chambers.

24. The system as in claim 21 in which one chamber is filled with fluid at a first high constant pressure, while the other chamber is filled with a fluid at a second high pulsating pressure.

25. The system as in claim 24 in which the chamber having the first pressure is filled with liquid, and the other chamber is filled with gas.

26. The system as in claim 25 in which said chamber is filled with liquid and said first chamber is filled with gas.

27. A system for creating a train of seismic waves in the earth comprising:
  a. a mass having extension means resting on the earth and supporting said mass in a position above the earth;
  b. at least one expandable chamber comprising at least two parts, a piston and a cylinder reciprocable vertically with respect to each other;
  c. a first part supported by the earth;
  d. a second part attached to said mass;
  e. means to inject pressurized fluid into said cylinder on the top side of said piston at a first selected superatmospheric pressure;
    whereby said chamber will expand vertically, said first part will press on the earth, and said second part will lift said mass above the earth; and
  f. means to apply a second superatmospheric pressure of said pressurized fluid sequentially to opposite sides of said piston on a selected ratio of time above to time below said piston;
    whereby said mass will act as a reaction mass and said first part will impart a train of pressure pulses on the earth and generate a train of seismic waves in the earth; and
  g. including means alternately to apply a constant superatmospheric fluid pressure to said cylinder below said piston and to reduce the pressure above said piston to atmospheric pressure;
    whereby said mass will be lowered until said extension means rest on the earth and said first part of said chamber is lifted above the earth.

28. The system as in claim 17 in which said double chambers comprise pistons in cylinders.

29. The system as in claim 17 in which said double chambers comprise flexible bags.

30. The system as in claim 17 including means alternately to apply a subatmospheric pressure to at least one of said two chambers, whereby said at least one chamber will be deflated, said mass will be lowered until said extension means rest on the earth, and said first part is lifted above the earth.

31. The system as in claim 17 including means alternately to apply a subatmospheric pressure to both of said chambers.

32. The system as in claim 17 including a plurality of double chambers.

33. In a seismic prospecting system, including a mass having extension means resting on the earth and supporting said mass in a position above the earth, at least one vertically expandable chamber comprising at least two parts reciprocable vertically with respect to each other, a first part supported on the earth and a second part attached to said mass, the method of generating seismic waves in the earth, comprising:
  a. injecting into said chamber a pressurized fluid at a selected superatmospheric pressure, thereby expanding vertically said chamber, one part of said chamber pressing on the surface of the earth, the second part pressing upwardly on said mass, and lifting at least part of said mass above the ground;
  b. modulating the pressure of said pressurized fluid to form a train of pulses of force of said first part onto the earth, generating a corresponding train of seismic waves in the earth;

c. stopping the modulation of said pressure of said pressurized fluid;

d. lowering the pressure of said pressurized fluid, thus reducing the expansion of said chamber, and permitting said mass to be lowered to its position on the ground; and e. applying a subatmospheric pressure to said chamber, thereby lifting said first part of said chamber off the ground.

* * * * *